US005527577A

United States Patent [19]

Walters et al.

[11] Patent Number: 5,527,577

[45] Date of Patent: Jun. 18, 1996

[54] FLEXIBLE EDUCTION TUBE FOR HAND DISPENSER

[75] Inventors: Peter J. Walters, Roselle; Mark Neuhalfen, Mt. Prospect, both of Ill.; Ronald E. Kieras, Muscatine, Iowa

[73] Assignee: Aptar Group, Inc., Cary, Ill.

[21] Appl. No.: 80,918

[22] Filed: Jun. 22, 1993

[51] Int. Cl.$^{6}$ .................................................... B29D 23/00

[52] U.S. Cl. .................. 428/36.9; 428/36.91; 428/36.92; 222/402.1

[58] Field of Search ................................. 428/35.7, 36.8, 428/36.9, 36.91, 36.92, 36.4; 222/402.1

[56] References Cited

U.S. PATENT DOCUMENTS

| | | | |
|---|---|---|---|
| 176,279 | 4/1876 | Chinnock | 215/3 |
| 2,805,001 | 9/1957 | Biederman | 222/211 |
| 2,818,201 | 12/1957 | Peck | 222/382 |
| 2,920,798 | 1/1960 | Samuel | 222/402.19 |
| 3,134,515 | 5/1964 | Callahan, Jr. | 222/211 |
| 3,211,349 | 10/1965 | Prussin et al. | 222/408.18 |
| 3,490,656 | 1/1970 | Taschner | 222/394 |
| 4,138,036 | 2/1979 | Bond | 222/105 |
| 4,252,256 | 2/1981 | Walsh | 222/211 |
| 4,461,406 | 7/1984 | Vannuci | 222/211 |
| 4,830,232 | 5/1989 | Greenberg et al. | 222/341 |
| 4,830,235 | 5/1989 | Miller | 222/416 |
| 5,083,685 | 1/1992 | Amemiya | 222/402.1 |

*Primary Examiner*—James J. Seidleck
*Assistant Examiner*—Michael A. Williamson
*Attorney, Agent, or Firm*—Frijouf, Rust & Pyle

[57] ABSTRACT

An apparatus and method is disclosed for an improved flexible eduction tube for discharging a liquid product from a container with a dispensing mechanism comprising a mixture of a flexible material with a dense filler material distributed within said flexible material to provide a specific gravity greater than the liquid product within the container for enabling an input aperture of the eduction tube to remain below the level of the liquid product within the container when the container is tipped from a vertical orientation. In another embodiment of the invention, the eduction tube comprises a flexible material and rigid means for providing a non-flexible eduction tube prior to insertion of the eduction tube within the container and for providing a flexible eduction tube upon contact with the liquid product within the container.

7 Claims, 7 Drawing Sheets

PRIOR ART

FLEXIBLE EDUCTION TUBE FOR HAND DISPENSER

BACKGROUND OF THE INVENTION

1. Field of the Invention

This invention relates to fluid sprinkling and more particularly to the fluid sprinkling of a product from a container having an improved flexible container eduction tube.

2. Background of the Invention

In the last several decades, hand operated dispensers have gained in popularity for dispensing a wide variety of products. Hand operated dispensers may be classified into aerosol dispensers or finger operated pump dispensers.

In a standard aerosol dispenser, an aerosol product and a propellant is sealed within a container by a mounting cup. The mounting cup houses an aerosol valve having a container eduction tube for providing a fluid conduit between the aerosol valve and the bottom of the container. The container eduction tube is commonly referred to as a dip tube. A valve button is secured to the aerosol valve by a valve stem.

When the valve button is depressed, the aerosol valve is opened and aerosol product passes from the bottom of the container through the eduction tube and through the aerosol valve and is discharged from a terminal orifice of the valve button.

In a standard finger operated pump dispenser, a pump product is sealed within a container by a container cap. The container cap supports a finger operated pump commonly referred to as a finger operated pump. The finger operated pump communicates with a container eduction tube for providing a fluid conduit between the finger operated pump and the bottom of the container.

When the finger pump is actuated, the finger pump draws product from the bottom of the container through the eduction tube to be projected by the finger pump from a terminal orifice of the finger pump.

During the operation of a hand operated dispenser, many operators tip the container at an angle of 180 degrees or greater while dispensing product from the container. When the container is tipped at an angle of 180 degrees or greater, an input aperture of the eduction tube is likely to be above the level of the product within the container. When the eduction tube is above the level of the product within the container, the hand operated dispenser will not dispense product from the container.

When the eduction tube is above the level of the product within a container, the aerosol propellent is discharged from the aerosol dispenser rather than the aerosol product. When the eduction tube is above the level of the product within a container, air within the container is drawn by the pump rather than the pump product. Accordingly, there is a need in the art to continuously maintain the eduction tube in the product with a container.

The prior art has attempted to solve the aforementioned problems of hand operated dispensers by attaching a metal weight to the distal end of the eduction tube. The weight attached to the distal end of the eduction tube forces the distal end of the eduction tube into the liquid product within the container. Unfortunately, the use of a metal weight has several shortcomings when used with hand operated dispensers. First, the metal weight is relatively large and adds to the cost of the hand operated dispenser. Second, the metal weight makes an audible noise when the metal weight strikes a side of the container. Third, the metal weight was difficult to insert on the distal end of the education tube and added to the process of inserting the distal end of the education tube into the container. Fourth, the metal weight reduces the cross-sectional area of the fluid flow producing an area of restriction which increases the potential of clogging in the area of restriction.

In an attempt to overcome some of these problems, some in the prior art have placed a metal weight inside of the eduction tube. One prior art manufacturer incorporated a flexible PVC eduction tube with a metal weight inserted into the distal end of the eduction tube. Unfortunately, the metal weight inside of the eduction tube restricts the flow of liquid product through the eduction tube.

Others in the prior art have attempted to overcome the problems by making the eduction tube out of the flexible material to allow gravity to move the eduction tube into liquid product. Unfortunately, as the eduction tube was made more flexible, the density of the eduction tube material was reduced below the density of the liquid product. As a result of the reduction of the density of the eduction tube, the eduction tube floated on the surface of the liquid product.

Many in the prior art have attempted to resolve this problem not only in the hand operated dispenser art but in other unrelated arts. U.S. Pat. No. 176,279 to Chinnock discloses a powder ejector pump for obnoxious or poisonous powders having a flexible extension for a discharge tube.

U.S. Pat. No. 2,805,001 to Biederman discloses a dispenser having a flexible spout which can be adjusted in length and which can be bent or turned to reach difficult accessible locations and the like.

U.S. Pat. No. 2,818,201 to Peck discloses a pump for mounting on a large liquid container incorporating a flexible tubing or hose for insertion into the large liquid container.

U.S. Pat. No. 2,920,798 to Samuel discloses a dispenser in which the eduction tube is articulated by means of a slip joint incorporating a ball-and-socket. The slip joint permits the eduction tube to swing as the dispenser receptacle is tilted and to separate the slip joint to open an alternate inlet when the receptacle is inverted.

U.S. Pat. No. 3,134,515 to Callahan discloses a liquid bottle provided with a suitable stopper slidably receiving a pliable tube. The tube may be extended from or retracted into the liquid bottle by sliding through the stopper.

U.S. Pat. No. 3,211,349 to Prussin et al discloses a flexible eduction tube for an aerosol dispenser containing a three phase system which permits substantially complete removal of the liquid active ingredient concentrate from the container. The flexible eduction tube includes a float having an inlet port that has a specific gravity greater than one of the two liquid phases and less than the other of the liquid phases.

U.S. Pat. No. 3,490,656 to Taschner discloses a compressed gas liquid dispenser capable of dispensing a liquid in any position through the use of flexible eduction tube having a weight disposed at the end of the eduction tube.

U.S. Pat. No. 4,138,036 to Bond discloses a compressed gas liquid dispenser that may be utilized in any orientation. The liquid dispenser incorporates a helical coil winding inserted in a flexible plastic bag such that the helical coil functions as a dispensing spout as the plastic bag collapses about the helical coil.

U.S. Pat. No. 4,252,256 to Walsh discloses a drinking apparatus including a flexible liquid-containing bag having a flexible drinking tube.

U.S. Pat. No. 4,461,406 to Vannucci discloses a container for dispensing liquids in which an elongated, resilient delivery tube is positioned within the container in a deflected and compressed condition, so that when a closure is removed from an opening in the container the upper end part of the delivery tube is urged out of the container.

U.S. Pat. No. 4,830,235 to Miller discloses an articulated siphon tube in conjunction with conventional spray head and a weighted siphon tube end.

Therefore, it is an object of the present invention to provide an improved flexible eduction tube for a hand operated dispenser wherein an input aperture of an eduction tube remains below the level of the aerosol product within a container when the container is tipped at an angle of 90 degrees from a vertical.

Another object of the present invention is to provide an improved flexible eduction tube for a dispensing device wherein an input aperture of the eduction tube remains below the level of the aerosol product within a container when the container is tipped at an angle of 90 degrees from a vertical without the use of external weights.

Another object of this invention is to provide an improved flexible eduction tube for a dispensing device that is suitable for use with existing aerosol valves.

Another object of this invention is to provide an improved flexible eduction tube for a dispensing device that may be secured to existing aerosol valves with conventional aerosol valve assembling equipment.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved eduction tube for a dispensing device for discharging a liquid product from a container with a dispensing mechanism. The dispensing mechanism is secured to the container with the eduction tube extending into the container into the liquid product within the container for enabling the liquid product to enter the eduction tube and to be discharged from a terminal orifice upon actuation of the dispensing mechanism.

In one embodiment of the invention, the eduction tube comprises a flexible material with rigid means cooperating with the eduction tube for providing a non-flexible eduction tube prior to insertion of the eduction tube within the container and for providing a flexible eduction tube upon insertion of the eduction tube within the container and upon interaction of the rigid means with the liquid product within the container.

In another embodiment of the invention, the eduction tube comprises a flexible material with a rigid means having a rigid physical property being disposed with the eduction tube. The eduction tube exhibits a non-flexible physical characteristic when the soluble rigid coating is disposed with the eduction tube for facilitating the insertion of the eduction tube within the container. The rigid means cooperates with the liquid product within the container for providing a flexible physical characteristic to the rigid means when the rigid means is immersed within the liquid product. The rigid means immersed within the liquid product provides the eduction tube with a flexible physical characteristic for enabling an input aperture of the eduction tube to remain below the level of the liquid product within the container when the container is tipped from a vertical orientation.

In another embodiment of the invention, the eduction tube comprises a dense flexible material to provide the eduction tube with a specific gravity greater than the liquid product within the container for enabling an input aperture of the eduction tube to remain below the level of the liquid product within the container when the container is tipped from a vertical orientation.

In another embodiment of the invention, the eduction tube comprises a mixture of a flexible material with a dense filler material distributed within the flexible material to provide the eduction tube with a specific gravity greater than the liquid product within the container for enabling an input aperture of the eduction tube to remain below the level of the liquid product within the container when the container is tipped from a vertical orientation.

In another embodiment of the invention, the eduction tube comprises a mixture of a flexible material with a dense filler material distributed within the flexible material to provide the eduction tube with a specific gravity greater than the liquid product within the container. A liquid or solid soluble rigid coating having a rigid physical property is secured to the eduction tube with the eduction tube exhibiting a non-flexible physical characteristic for facilitating the insertion of the eduction tube within the container. The soluble rigid coating is dissolved by the liquid product within the container enabling the eduction tube to exhibit a flexible physical characteristic for enabling an input aperture of the eduction tube to remain below the level of the liquid product within the container when the container is tipped from a vertical orientation.

In another embodiment of the invention, the eduction tube comprises a flexible tube and an absorbent material with the absorbent material of the eduction tube having a generally non-flexible physical characteristic when the absorbent material is void of an absorbed liquid product. The absorbent material of the eduction tube has a flexible physical characteristic when the absorbent material has absorbed the liquid product to provide the eduction tube with a non-flexible physical characteristic when the absorbent material is void of an absorbed liquid product for facilitating insertion of the eduction tube within the container. The absorbent material provides the eduction tube with a flexible physical characteristic when the absorbent material has absorbed liquid product from the container for enabling an input aperture of the eduction tube to remain below the level of the liquid product within the container when the container is tipped from a vertical orientation.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
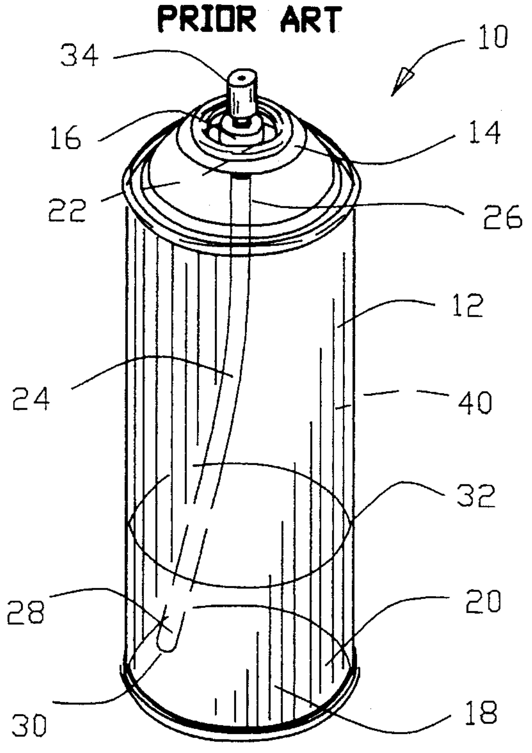
FIG. 1 PRIOR ART
FIG. 1 is an isometric view of an aerosol dispenser having a prior art eduction tube.
Figure 2:
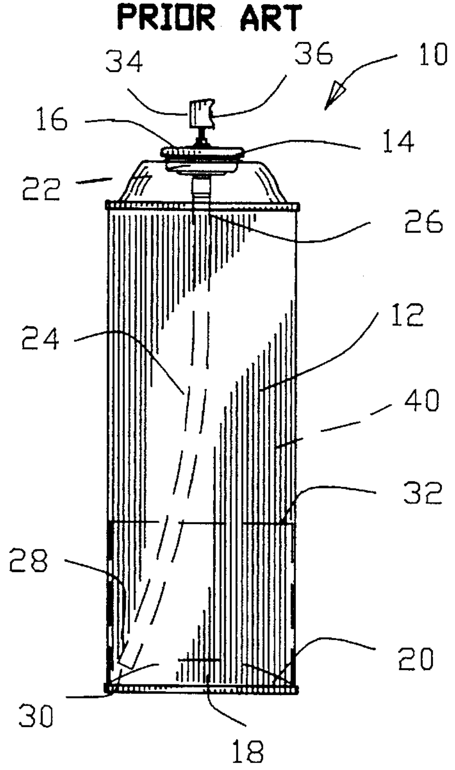
FIG. 2 PRIOR ART
FIG. 2 is an elevational view of the aerosol dispenser of FIG. 1.

FIGS. 1 and 2 are isometric and elevational views of a prior art dispenser 10 shown as an aerosol dispenser, comprising a container 12 having a peripheral rim 14 for receiving a valve mounting cup 16 with the valve mounting cup 16 being crimped to the container 12 in a conventional manner. The container 12 defines a bottom central region 18 and a bottom peripheral region 20 thereof.

The mounting cup 16 supports an aerosol valve 22 of conventional design, the operation of which should be well known to those skilled in the art. An eduction tube 24 comprises a proximal end 26 and a distal end 28 with the proximal end 26 of the eduction tube 24 being connected to the aerosol valve 22. The distal end 28 of the eduction tube 24 defines an input aperture 30 for communicating with the product 32 within the container 12. The aerosol valve 22 supports a valve button 34 having a terminal orifice 36.

The aerosol valve 22 is movable between a closed position and an open position. Upon a displacement of the valve button 34, the aerosol valve 22 is moved into the open position whereat a propellant 40 forces the product 32 into the input aperture 30 at the distal end 28 of the eduction tube 24, through the aerosol valve 22 to be discharged from the terminal orifice 36.

Generally, aerosol dispensers use a liquid hydrocarbon propellent 40 suitable for mixing with a liquid product 32 within the container 12. A portion of the liquid hydrocarbon propellent 40 vaporizes at ambient temperature inside the container 12 to create a constant hydrocarbon vapor pressure. The hydrocarbon vapor pressure maintains a constant internal pressure even during the reduction of the volume of the liquid hydrocarbon propellent. The hydrocarbon vapor pressure provides the necessary pressure for dispensing all of the liquid product 32 within the container 12.

The aerosol industry also uses compressed gases such as compressed air or nitrogen, carbon dioxide or the like as a replacement for hydrocarbon propellant. A major disadvantage of the use of a compressed gas as an aerosol propellent is that the pressure of a constant temperature compressed gas will vary inversely with gas volume in accordance with Boyles Law. As the amount of the compressed gas is reduced in the container 12 by initial dispensing of the product 32, the internal pressure of the compressed gas is correspondingly reduced within the container 12. Accordingly, a compressed gas requires a greater initial pressure and a greater initial volume relative to a hydrocarbon propellent. The greater initial volume of compressed gas is required in order to provide sufficient pressure within the aerosol dispenser to propel all of the product 32 from the aerosol dispenser. Any unnecessary use of the compressed gas propellant 40 may result in an insufficient amount of compressed gas remaining within the container 12 to satisfactorily propel the product 32 from the container 12.

Generally, the aerosol industry uses a blend of LLDPE and LDPE for the eduction tube 24 material. The blend of LLDPE and LDPE for the eduction tube 24 material is semi-stiff having an approximate flexural modulus of 32,000 psi. Since the eduction tube 24 material is shipped in large coil, the semi-stiff eduction tube 24 material retains an arcuate or curved shape when the eduction tube 24 material is severed from the large coil and is secured to the aerosol valve 22. The arcuate or curved shape of the eduction tube 24 results in a distal end 28 of the eduction tube 24 curving into a bottom peripheral region 20 of the container 12. The distal end 28 of the eduction tube 24 remains at the bottom peripheral region 20 of the container 12 irrespective of the rotation or tilting of the container 12.

Figure 3:
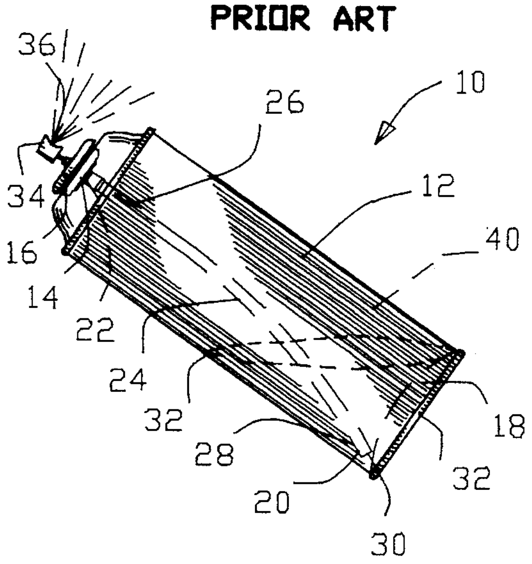
FIG. 3 PRIOR ART
FIG. 3 is an elevational view of the aerosol dispenser of FIGS. 1 and 2 in a first tilted orientation.

FIG. 3 is an elevational view of the aerosol dispenser 10 of FIGS. 1 and 2 in a first tilted orientation. Due to the fixed position of the eduction tube 24, the input aperture 30 at the distal end 28 of the eduction tube 24 is below the level of the product 32 within the container 12. Upon the displacement of the valve button 34, the propellant 40 forces the product 32 into the input aperture 30 of the eduction tube 24 to be discharged from the terminal orifice 36.

Figure 4:
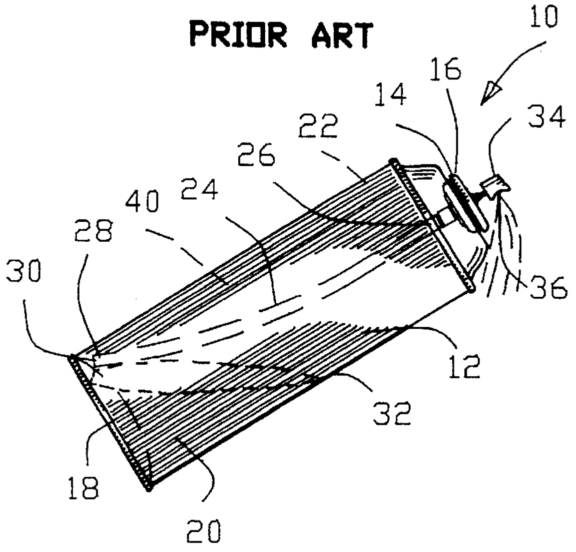
FIG. 4 is an elevational view of the aerosol dispenser of FIGS. 1 and 2 in a second tilted orientation.

FIG. 4 is an elevational view of the aerosol dispenser 10 of FIGS. 1 and 2 in a second tilted orientation. Due to the fixed position of the eduction tube 24, the input aperture 30 at the distal end 28 of the eduction tube 24 is above the level of the product 32 within the container 12. Upon the displacement of the valve button 34, only the propellant 40 enters the input aperture 30 at the distal end 28 of the eduction tube 24 and only propellent 40 is discharged out of the terminal orifice 36. Under the orientation of the container 12 as shown in FIG.4, the product 32 remains in the container 12 and the discharged propellant 40 is wasted.

Figure 5:
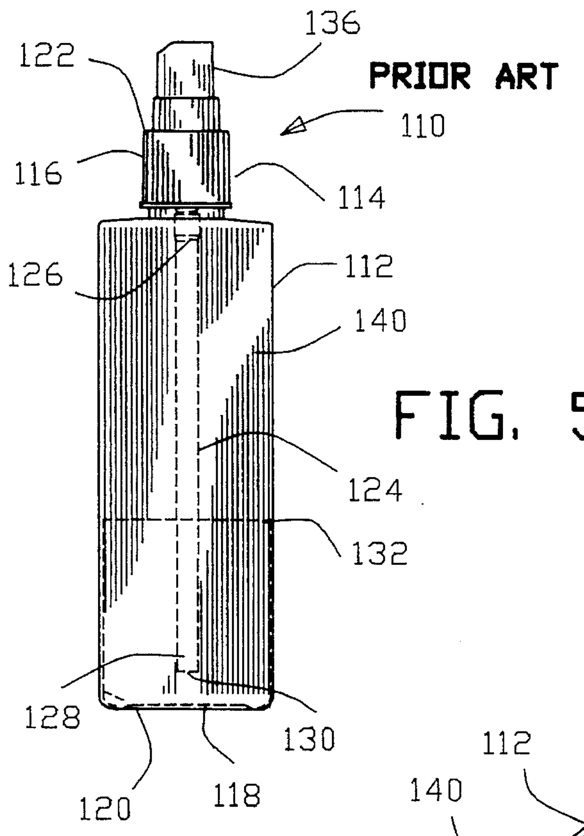
FIG. 5 is an elevational view of a pump dispenser having a prior art eduction tube.

FIG. 5 is an elevational view of a hand operated pump dispenser 110 comprising a container 112 having a peripheral rim 114 for receiving a container 116 cap. The container 112 defines a bottom central region 118 and a bottom peripheral region 120 thereof.

The container cap 116 supports a finger operated pump 122 of conventional design, the operation of which should be well known to those skilled in the art. A proximal end 126 of an eduction tube 124 is connected to the finger pump 122 with a distal end 128 of the eduction tube 124 communicating with a product 132 within the container 112. When the finger pump 122 is actuated, the finger pump draws product 132 from the bottom of the container 112 into an input aperture 130 at the distal end 128 of the eduction tube 124, to be projected by the finger pump 122 from a terminal orifice 136 of the finger pump 122.

Since a finger pump 122 creates a partial vacuum with the eduction tube 124 for drawing the liquid product 132 from the container 112, the eduction tube 124 is selected to be rigid to avoid collapsing of the eduction tube 124 when subjected to a partial vacuum. Accordingly, the eduction tube 124 will only draw liquid from the bottom central region 118 of the container 112. In general, liquid product 132 at the bottom peripheral region 120 cannot be dispensed by a hand operated pump dispenser 110.

Figure 6:
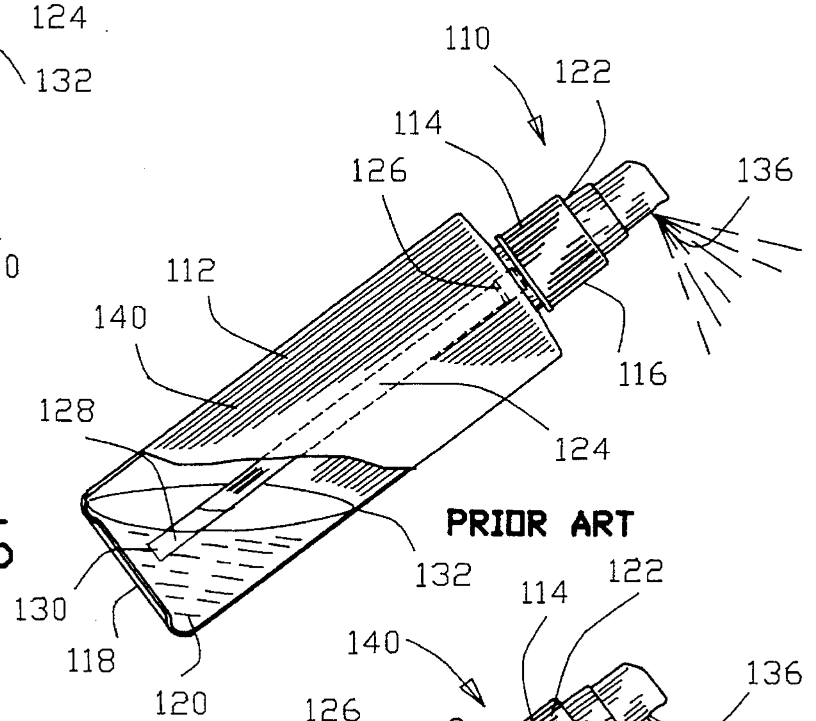
FIG. 6 is an elevational view of the pump dispenser of FIG. 5 in a first tilted orientation.

FIG. 6 is an elevational view of the hand operated dispenser 110 of FIG. 5 in a first tilted orientation. Due to the fixed position of the eduction tube 124, the input aperture 130 at the distal end 128 of the eduction tube 124 is below the level of the product 132 within the container 112. When the finger pump 122 is actuated, the finger pump 122 draws product 132 from the bottom central region 118 of the container 112 into the input aperture 130 of the eduction tube 124 to be projected from the terminal orifice 136 of the finger pump 122.

Figure 7:
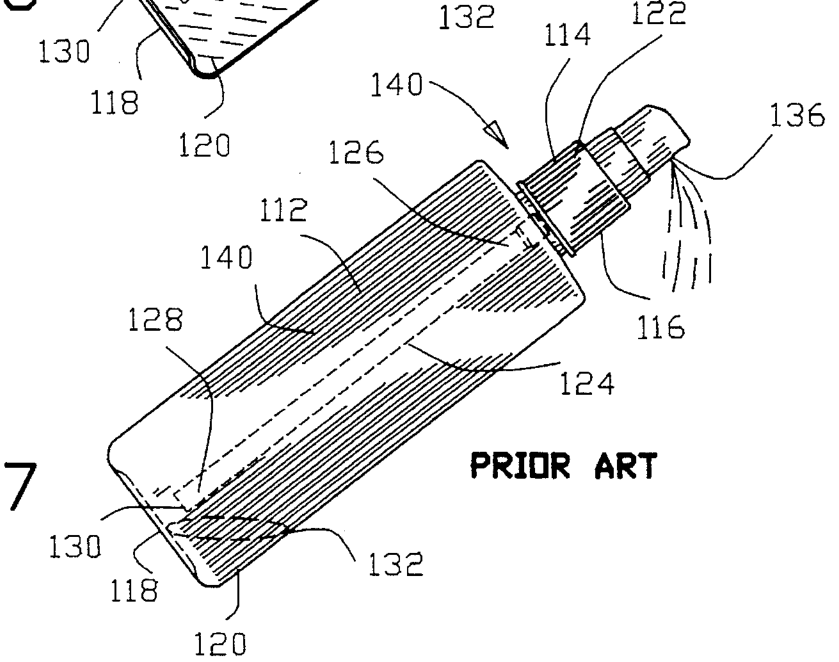
FIG. 7 is an elevational view of the pump dispenser of FIG. 5 in a second tilted orientation.

FIG. 7 is an elevational view of the hand operated dispenser 110 of FIG. 5 in a second tilted orientation. Due to the fixed position of the eduction tube 124, the input aperture 130 at the distal end 128 of the eduction tube 124 is above the level of the product 132 within the container 112. When the finger pump 122 is actuated, the finger pump 122 draws only air from the container 112 into an input aperture 130 of the eduction tube 124. Under the orientation of the container 112 shown in FIG. 7, the product 132 remains in the container 112.

Figure 8:
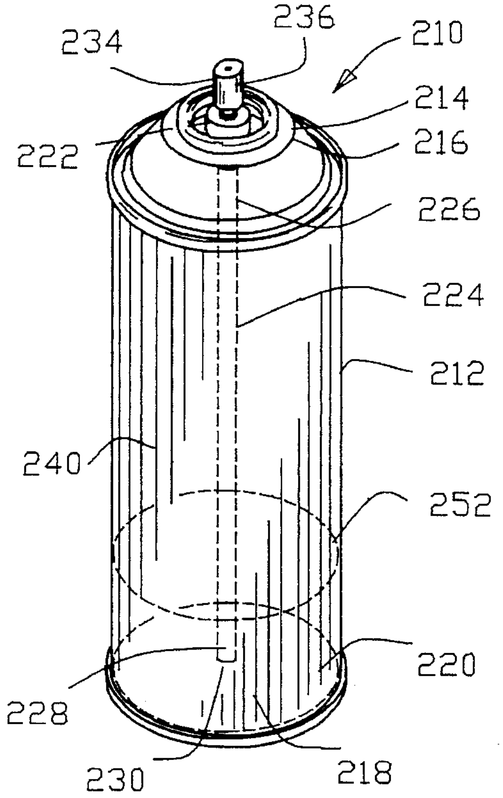
FIG. 8 is an isometric view of an aerosol dispenser having a flexible eduction tube in accordance with the present invention.
Figure 9:
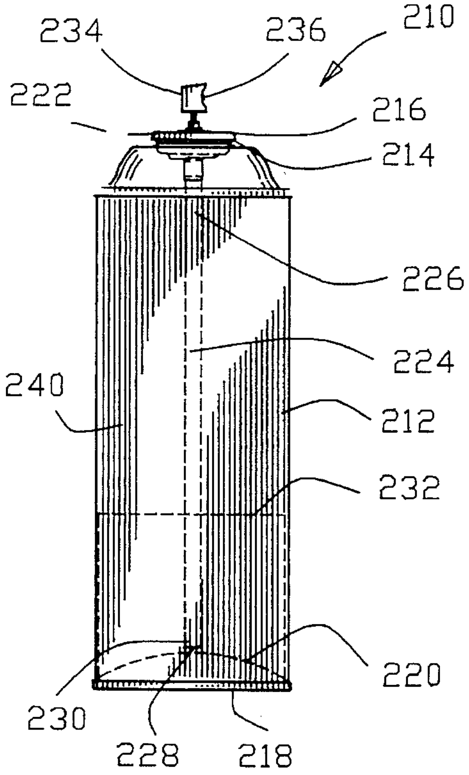
FIG. 9 is an elevational view of the aerosol dispenser of FIG. 8.

FIGS. 8 and 9 are isometric and elevational views of a dispenser shown as an aerosol dispenser 210 similar to the aerosol dispenser 10 of FIGS. 1–4 incorporating a flexible eduction tube 224 of the present invention. A proximal end 226 of the eduction tube 224 is connected to an aerosol valve 222 with a distal end 228 of the eduction tube 224 communicating with the product 232 within the container 212. The flexible eduction tube 224 of the present invention has solved the aforementioned problems shown in FIGS. 1–7 of the prior art by providing a flexible eduction tube 224 having sufficient flexibility to flex into a bottom peripheral regions 220 of the container 212 while having a specific gravity greater than the liquid product 232 within the container 212.

Figure 10:
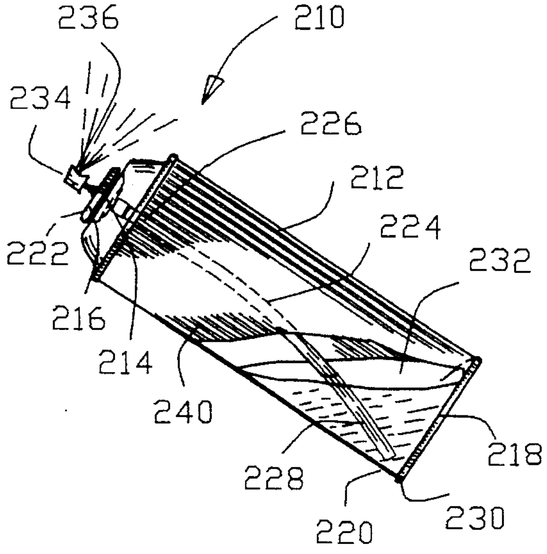
FIG. 10 is an elevational view of the aerosol dispenser of FIGS. 8 and 9 in a first tilted orientation.

FIG. 10 is an elevational view of the aerosol dispenser 210 of FIGS. 8 and 9 in a first tilted orientation. Due to the flexible eduction tube 224, an input aperture 230 at the distal end 228 of the eduction tube 224 is below the level of the product 232 within the container 212. Upon the displacement of a valve button 234, a propellant 240 forces the product 232 into the input aperture 230 of the eduction tube 224 to be discharged from a terminal orifice 236.

Figure 11:
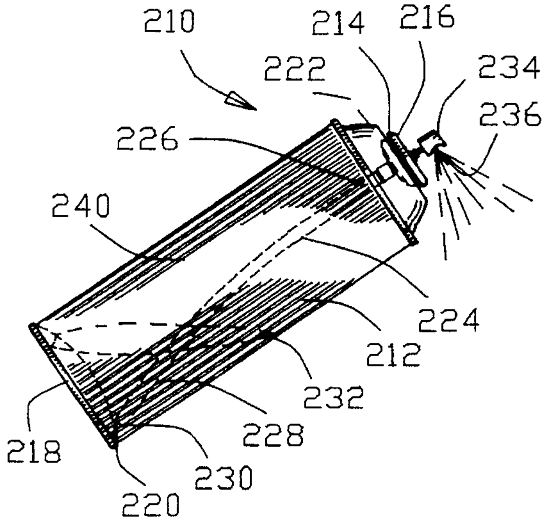
FIG. 11 is an elevational view of the aerosol dispenser of FIGS. 8 and 9 in a second tilted orientation.

FIG. 11 is an elevational view of the aerosol dispenser 210 of FIGS. 8 and 9 in a second tilted orientation. In this example, the flexible eduction tube 224 flexes to move the input aperture 230 at the distal end 228 of the eduction tube 224 below the level of the product 232 within the container 212. Upon the displacement of the valve button 234, the propellant 240 forces the product 232 into the input aperture 230 of the eduction tube 224 to be discharged from the terminal orifice 236.

Figure 12:
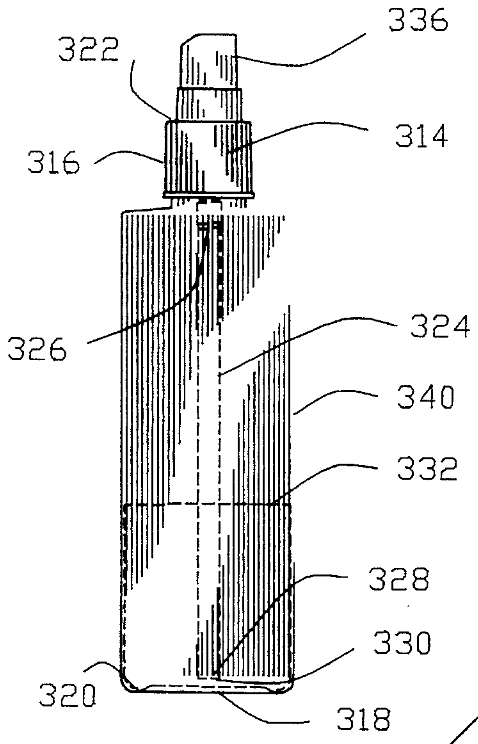
FIG. 12 is an elevational view of a pump dispenser having a flexible eduction tube in accordance with the present invention.

FIG. 12 is an elevational view of a hand operated pump 310 dispenser similar to the pump dispenser 110 of FIG. 5 incorporating a flexible eduction tube 324 of the present invention. A proximal end 326 of an eduction tube 324 is connected to a finger pump 322 with a distal end 328 of the eduction tube 324 communicating with the product 332 within the container 312. The flexible eduction tube 324 of the present invention has solved the aforementioned problems shown in FIGS. 5–7 of the prior art by providing a flexible eduction tube 324 having sufficient flexibility to flex into the bottom peripheral region 320 of the container 312 while having a specific gravity greater than the liquid product 332 within the container 312. In addition, the flexible eduction tube 324 has sufficient strength to avoid collapsing of the eduction tube 324 when subjected to a partial vacuum.

Figure 13:
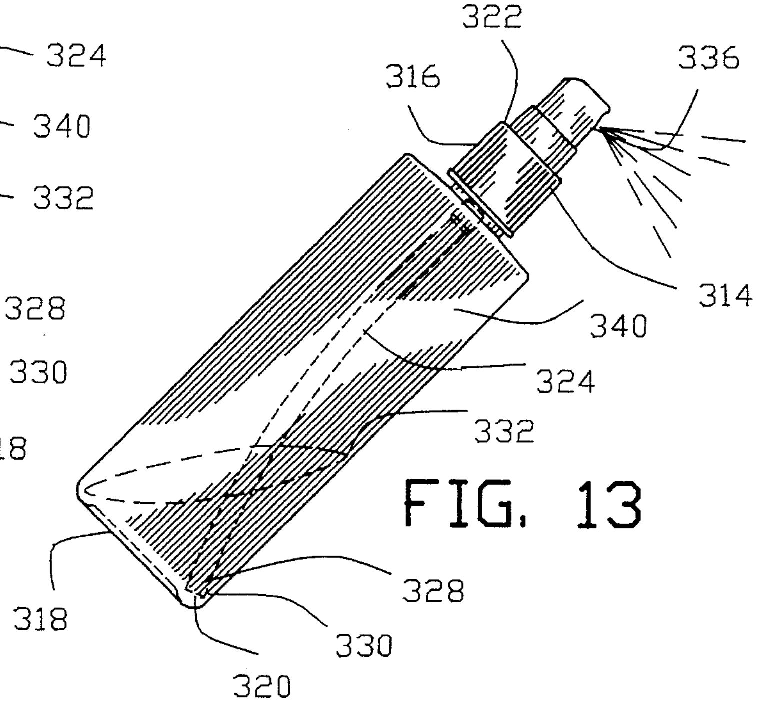
FIG. 13 is an elevational view of the pump dispenser of FIG. 12 in a first tilted orientation.

FIG. 13 is an elevational view of the hand operated dispenser 310 of FIG. 12 in a first tilted orientation. Due to the flexing of the flexible eduction tube 324, an input aperture 330 at the distal end 328 of the eduction tube 324 is below the level of the product 332 within the container 312. When the finger pump 322 is actuated, the finger pump 322 draws product 232 from the bottom peripheral region 320 of the container 312 into an input aperture 330 of the eduction tube 324 to be projected from a terminal orifice 336 of the finger pump 322.

Figure 14:
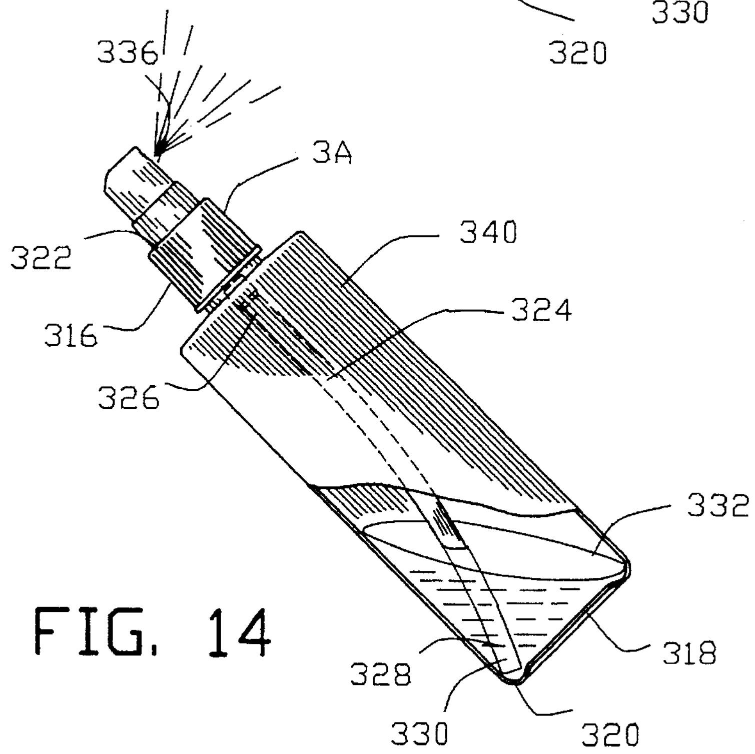
FIG. 14 is an elevational view of the pump dispenser of FIG. 12 in a second tilted orientation.

FIG. 14 is an elevational view of the hand operated dispenser 310 of FIG. 12 in a second tilted orientation. Due to the flexing of the flexible eduction tube 324, the input aperture 330 at the distal end 328 of the eduction tube 324 is again below the level of the product 332 within the container 312. When the finger pump 322 is actuated, the finger pump 322 draws product 332 from the bottom peripheral region 320 of the container 312 into the input aperture 330 of the eduction tube 324 to be projected from a terminal orifice 336 of the finger pump 322. In addition, the flexibility of the flexible eduction tube 324 enables the hand operated pump 322 to draw the liquid product 332 at the bottom peripheral region 320 of the container 312 in contrast to the prior art.

Figure 15:
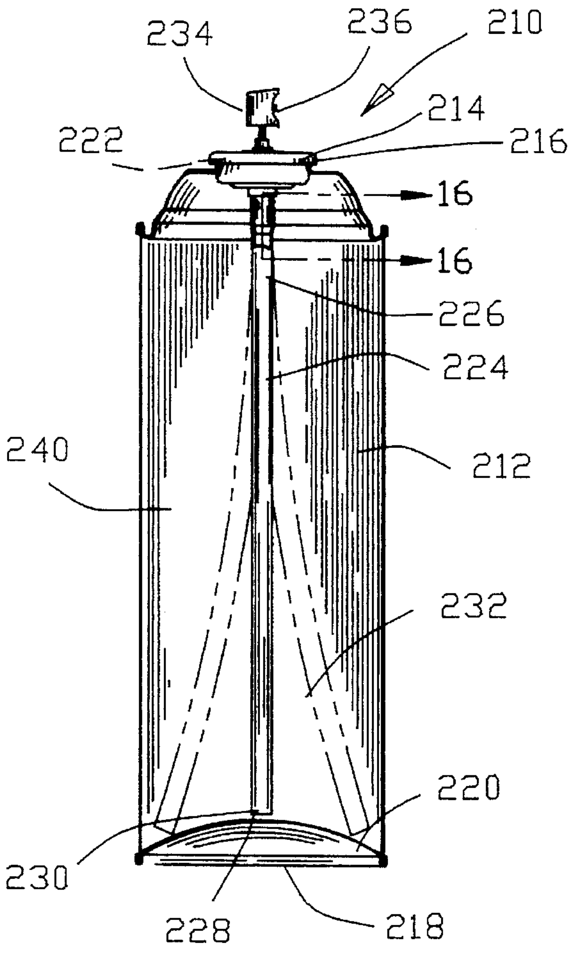
FIG. 15 is an enlarged view of the aerosol dispenser shown in FIG. 9 illustrating a first embodiment of the flexible eduction tube of the present invention.
Figure 16:
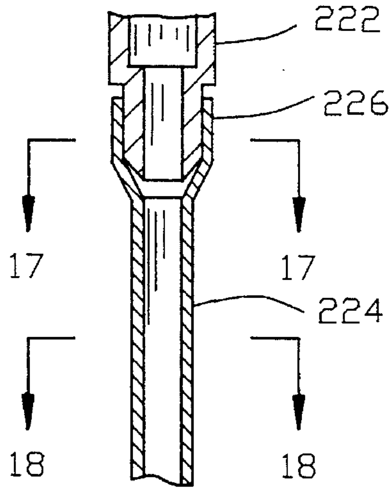
FIG. 16 is an enlarged sectional view along line 16—16 in FIG. 15.
Figure 17:
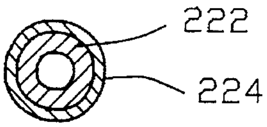
FIG. 17 is a sectional view along line 17—17 in FIG. 16.

FIG. 15 is an enlarged view of the aerosol dispenser 210 shown in FIG. 9. FIGS. 16 and 17 illustrate the proximal end 224 of the flexible eduction tube 224 being shown expanded for securing the flexible eduction tube 224 to a portion of the aerosol valve 222 in a conventional manner.

Figure 18:
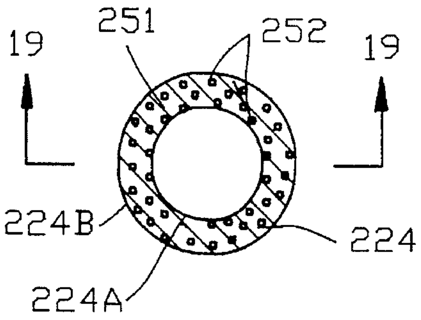
FIG. 18 is an enlarged and microscopic sectional view along line 18—18 in FIG. 16.
Figure 19:
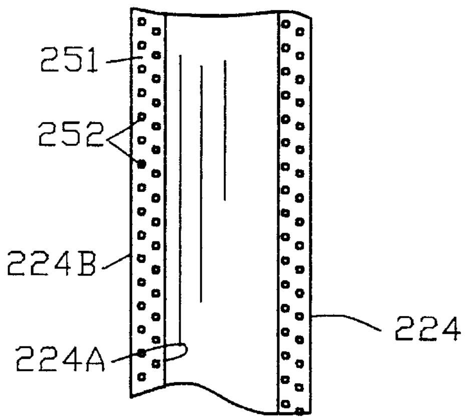
FIG. 19 is a sectional view along line 19—19 in FIG. 18.

FIG. 18 is an enlarged and microscopic sectional view along line 18—18 in FIG. 16 whereas FIG. 19 is sectional view along line 19—19 in FIG. 18. The flexible eduction tube 224 is defined by an inner diameter 224A and an outer diameter 224B and comprises a flexible material 251 and a filler material 252 as will be described in greater detail hereinafter.

The flexibility of the flexible eduction tube 224 is determined by both the physical geometry of the flexible eduction tube 224 and the material properties of the selected flexible material 251 of the flexible eduction tube 224. Among the critical parameters for the proper operation of the flexible eduction tube 224 is the physical geometry of the flexible eduction tube 224 including the inner diameter 224A, the outer diameter 224B and the length of the flexible eduction tube 224. The deflection of the distal end 228 of the flexible eduction tube 224 increases with an increase in the length of the flexible eduction tube 224. As the length of the flexible eduction tube 224 is increased, the amount of deflection at the distal end 228 is likewise increased for a given flexible material 251 for the flexible eduction tube 224.

The deflection of the distal end 228 of the flexible eduction tube 224 increases with a decrease in the outer diameter 224B of the flexible eduction tube 224 while maintaining a constant inner diameter 224A. As the outer diameter 224B of the flexible eduction tube 224 is decreased, the amount of deflection at the distal end 228 is increased for a given flexible material 251 for the flexible eduction tube 224 while maintaining a constant inner diameter 224A. The physical geometry of the flexible eduction tube 224 also influences the buoyancy force of the flexible eduction tube 224 in the liquid product 232.

The deflection of the distal end 228 of the flexible eduction tube 224 increases with an increase in the density of a filler material 252 due to the increased overall density of the eduction tube 224. Accordingly, as the overall density of the flexible eduction tube 224 is increased, the amount of deflection at the distal end 228 is increased for a given physical geometry of the eduction tube 224. However, the flexibility of the distal end 228 of the flexible eduction tube 24 decreases with an increase in the amount of the filler material 252 added to the flexible eduction tube 224. Typically, the more filler material 252 added to the flexible eduction tube 224, the less flexible is the eduction tube 224.

In this first embodiment of the invention, the flexible eduction tube 224 is made of a flexible polymer or an elastomer flexible material 251 filled with a dense inorganic or organic powder filler material 252 to produce a flexible eduction tube 224 with a density greater than the density of the liquid product 232 within the container 212. The flexible material 251 is selected from either a natural or a synthetic elastomer depending upon the type and properties of the product 232 within the container 212.

Preferably, the flexible material 251 and the filler material 252 are compounded to distribute the filler material 252 into the flexible material 251 to provide a homogeneous or uniform mixture. Compounding reduces any hazard associated with a dry filler powder used as a filler material 252. The compounding of the filler material 252 into the flexible material 251 may be accomplished by (a) internal mixers, (b) mills, and (c) extruders.

An internal mixer compounds the flexible material 251 and the filler material 252 by a shearing action of rotating blades inside an enclosed chamber of the internal mixer. The flexible material 251 and the filler material 252 are forced to flow between the rotating blades and a close fitting wall of the internal chamber to mix the flexible material 251 and the filler 252 thereby.

A mill compounds the flexible material 251 and the filler material 252 between a plurality of heated parallel rollers that rotate in opposite directions with a relatively small gap therebetween. The flexible material 251 and the filler material 252 are introduced within the gap whereby the plurality of rollers cause the flexible material 251 and the filler material 252 to fold and blend together.

An extruder compounds the flexible material 251 and the filler material 252 between a screw and a barrel. The flexible material 251 and the filler material 252 are introduced between the screw and the barrel where extreme shearing action occurs to compound the flexible material 251 and the filler material 252.

Preferably, the elastomer has a flexural modulii of less than 10,000 psi. Although the majority of the liquid within the container 212 is generally isopropyl alcohol having specific gravity of 0.89 and water having a specific gravity of 1.00, other ingredients may increase the specific gravity of the liquid product 232 to greater than 1.00. Preferably, the flexible eduction tube 224 has a specific gravity greater than the specific gravity of the liquid product 232 and typically 1.15.

In one example of the first embodiment of the invention, the flexible material 251 is a thermoplastic elastomer containing a styrene-ethylene butylene-styrene copolymer with a barium sulfate filler material 252.

The density and amount of filler material 252 primarily affects the overall density of the flexible eduction tube 224 and secondarily affects the flexibility of the flexible eduction tube 224. Although lower density filler materials 252 such as calcium carbonate and talc may be used in the present invention, the amount of filler material 252 needed to obtain the desired specific gravity of the flexible eduction tube 224 decreases the desired flexibility of the flexible eduction tube 224. Since the density of barium sulfate as a filler material 252 is higher than most organic filler materials 252, the desired specific gravity of the flexible eduction tube 224 can be achieved with a minimum amount of filler material 252 thus providing the maximum flexibility of the flexible eduction tube 224 for the desired specific gravity.

Figure 20:
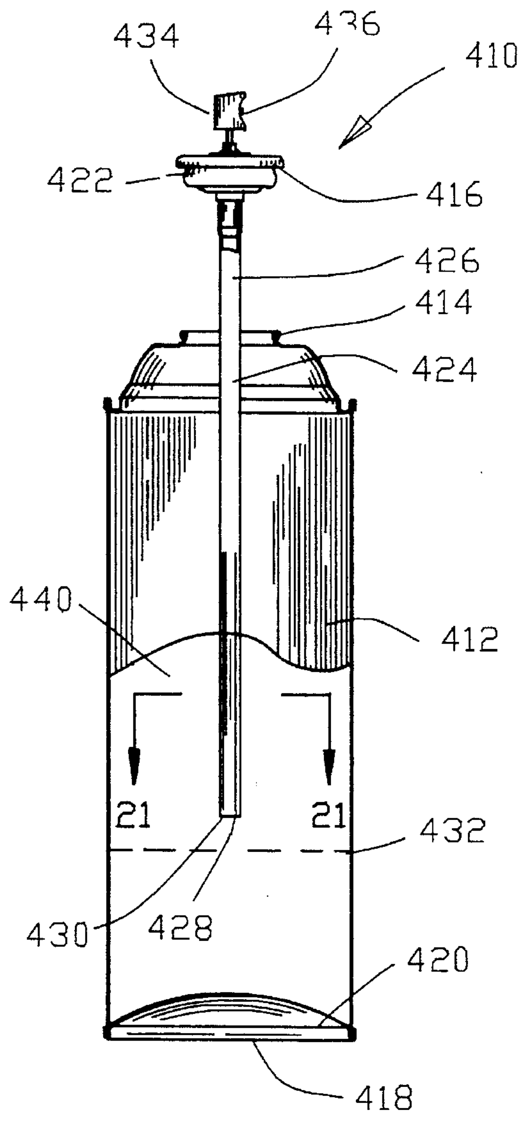
FIG. 20 is an enlarged view illustrating the assembling of the aerosol dispenser shown in FIG. 9 with a second embodiment of a flexible eduction tube having a dry absorbent layer thereon.

FIG. 20 is an enlarged view of an aerosol dispenser 410 similar to the aerosol dispenser 210 shown in FIG. 9. illustrating the assembling of the aerosol dispenser 410 with a second embodiment of a flexible eduction tube 424.

Figure 21:
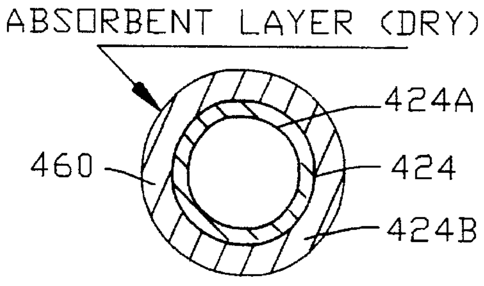
FIG. 21 is an enlarged sectional view along line 21—21 in FIG. 20.

FIG. 21 is an enlarged sectional view along line 21—21 in FIG. 20 illustrating the second embodiment of the flexible eduction tube 424 having a dry absorbent layer 460 thereon. In contrast to a high density filler material 252 being dispersed within the flexible material 251 of the eduction tube 224 of the first embodiment of the invention, the second embodiment of the invention includes a layer of liquid absorbent material 460. In the alternative, the liquid absorbent material 460 may be dispersed within the eduction tube 424.

The layer of the absorbent material 460 has a generally non-flexible physical characteristic when the absorbent material 460 is void of an absorbed liquid. However, the absorbent material 460 has a flexible physical characteristic when the absorbent material 460 has absorbed a liquid. When a layer of the absorbent material 460 is secured to the eduction tube 424 or when the absorbent material 460 is dispersed within the eduction tube 424, the eduction tube 424 exhibits a non-flexible physical characteristic when the absorbent material 460 is void of an absorbed liquid. The non-flexible physical characteristic of the eduction tube 424 facilitates control of the flexible eduction tube 424 during the manufacturing processes. In addition, the non-flexible physical characteristic of the eduction tube 424 facilitates the insertion of the eduction tube 424 within the container 412 by automatic machinery at a filling plant as shown in FIG. 20.

Figure 22:
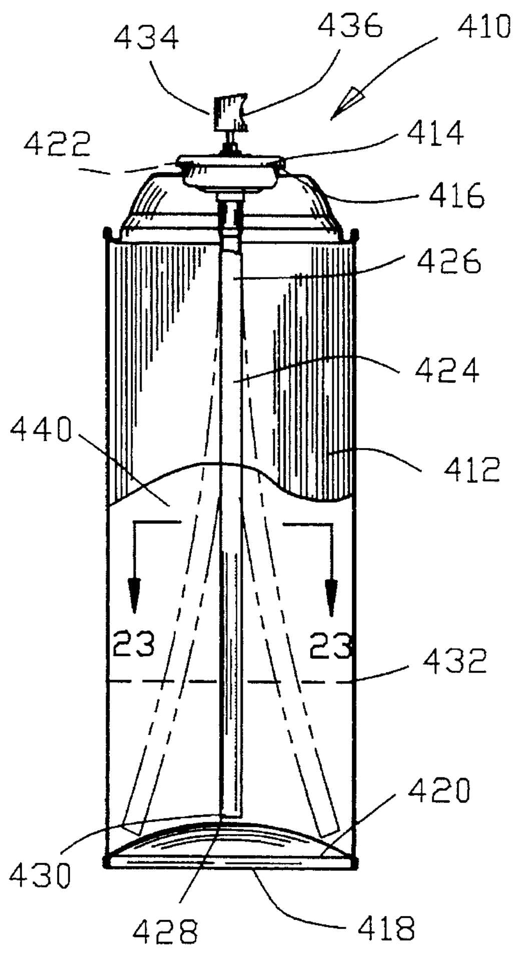
FIG. 22 is an enlarged view illustrating the assembled aerosol dispenser shown in FIG. 20 with a wet absorbent layer of the flexible eduction tube.
Figure 23:
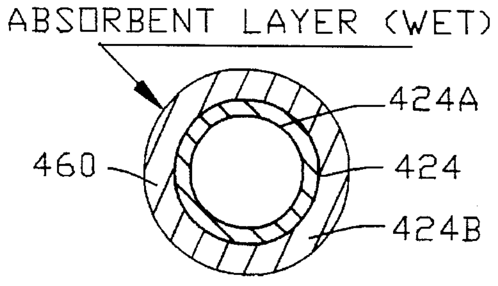
FIG. 23 is an enlarged sectional view along line 23—23 in FIG. 23.

FIGS. 22 and 23 illustrate the aerosol dispenser 410 of FIGS. 20 and 21 after the absorbent material 460 of the flexible eduction tube 424 has absorbed the liquid product 432 from the container 412. When the absorbent material 460 absorbs a liquid product 432 from the container 412, the absorbent material 460 has a flexible physical characteristic. Accordingly, when the absorbent material 460 absorbs liquid product 432 from the container 412, the eduction tube 424 exhibits a flexible physical characteristic as shown in FIG. 22. The flexible physical characteristic of the flexible eduction tube 424 enables an input aperture 430 of the eduction tube 424 to remain below the level of the liquid product 432 within the container 412 when the container 412 is tipped from a vertical orientation.

Upon insertion of the flexible eduction tube 424 within the container 412 containing liquid product 432, the absorbent material 460 absorbs a small portion of the liquid product 432 to reduce or eliminate the surface tension between the eduction tube 424 and the liquid product 432. The reduction of the surface tension reduces the tendency for the eduction tube 424 to float on the surface of the liquid product 432 and increase the tendency for the eduction tube 424 to sink to the bottom of the container 412.

Preferably, the flexible eduction tube 424 of the second embodiment of the invention comprises an elastomer eduction tube 424 and an absorbent material 460 secured to either the inner diameter 424A or the outer diameter 424B of the flexible eduction tube 424. In the alternative, the absorbent material 460 may be dispersed within an elastomer eduction tube 424 as shown in FIGS. 18 and 19. Although many absorbent materials 460 may be incorporated with the present invention, polyacrylates, activated alumina and hydrous aluminum silicate may be used With the present invention. A polyacrylate sold by NALCO is capable of absorbing water up to several hundred times the weight of the polyacrylate. Activated alumina or aluminum oxide is capable of adsorbing up to 43% moisture by weight. Hydrous aluminum silicate sold under the tradename "HECTABRITE" is capable of adsorbing up to 10% moisture by weight.

The absorbent material 460 may be dispersed into the flexible eduction tube 424 material by extrusion compounding. The flexible eduction tube 424 material and the absorbent material 460 are introduced into an extruder at a predetermined proportion and allowed to uniformly mix. The mixture of the flexible eduction tube 424 material and the absorbent material 460 may then be formed into the flexible eduction tube 424 by suitable means such as an extrusion process.

Figure 24:
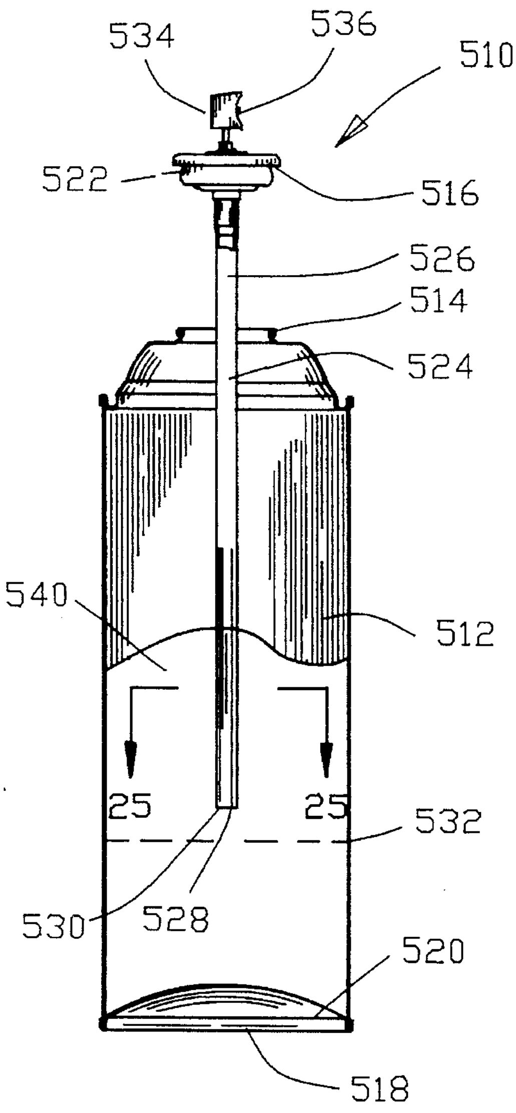
FIG. 24 is an enlarged view illustrating the assembling of the aerosol dispenser shown in FIG. 9 with a third embodiment of a flexible eduction tube having a soluble layer thereon.

FIG. 24 is an enlarged view of an aerosol dispenser 510 similar to the aerosol dispenser 210 shown in FIG. 9. illustrating the assembling of the aerosol dispenser 510 with a third embodiment of a flexible eduction tube 424.

Figure 25:
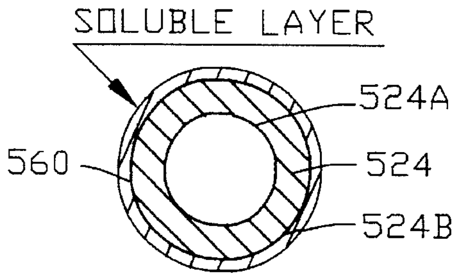
FIG. 25 is an enlarged sectional view along line 25–25 in FIG. 24.

FIG. 25 is an enlarged sectional view along line 25—25 in FIG. 24 illustrating the third embodiment of the flexible eduction tube 424 having a layer of soluble rigid material 560 having a rigid physical property. As set forth previously, a flexible eduction tube 524 presents certain problems during manufacturing and during insertion of the flexible eduction tube 524 during the filling process as illustrated in FIG. 24. The layer of soluble rigid material 560 of the third embodiment of this invention provides a further solution to overcome these problems.

The flexible eduction tube 524 exhibits a non-flexible physical characteristic when the layer of soluble rigid material 560 is disposed on the flexible eduction tube 524 as shown in FIGS. 24 and 25. The non-flexible physical characteristic of the eduction tube 524 facilitates control of the flexible eduction tube 524 during the manufacturing processes and facilitates the insertion of the eduction tube 524 within the container 512 by automatic machinery at a filling plant.

Figure 26:
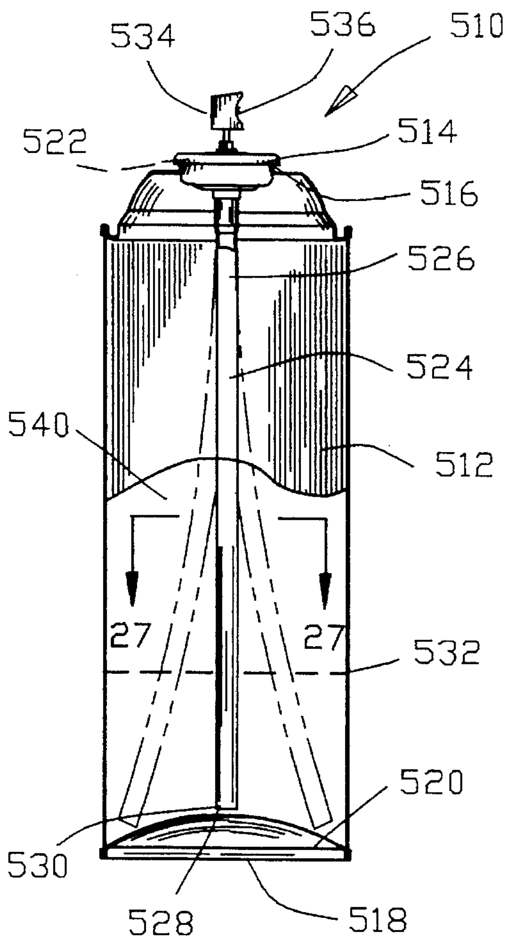
FIG. 26 is an enlarged view illustrating the assembled aerosol dispenser shown in FIG. 24 with the soluble layer of the flexible eduction tube being dissolved within the container.
Figure 27:
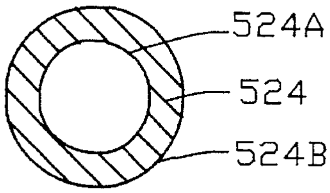
FIG. 27 is an enlarged sectional view along line 27—27 in FIG. 26.

FIGS. 26 and 27 illustrate the aerosol dispenser 510 of FIGS. 24 and 25 after the layer of soluble rigid material 560 of the flexible eduction tube 524 has been dissolved by the liquid product 532 from the container 512. Preferably, the layer of soluble rigid material 560 is soluble in water or alcohol depending upon the selected liquid product 532.

When the eduction tube 524 is inserted into the container 512, the liquid product 532 within the container 512 dissolves the layer of soluble rigid material 560. After the soluble layer of soluble rigid material 560 is dissolved, the eduction tube 524 exhibits a flexible physical characteristic. The flexible physical characteristic of the flexible eduction tube 524 enables an input aperture 530 of the eduction tube 524 to remain below the level of the liquid product 532 within the container 512 when the container 512 is tipped from a vertical orientation.

Although many materials may be used for the soluble rigid coating, the following materials are examples of water soluble or biodegradable soluble materials 560 that are suitable for use with the second embodiment of the invention. A soluble material 560 sold under the tradename "NOVON" is a polymer material based on starch and is completely biodegradable. A soluble material 560 sold under the tradename "VINEX" is a water soluble thermoplastic polyvinyl alcohol. A soluble material 560 sold under the tradename "METHOCEL" is a water soluble polymer derived from cellulose.

The soluble rigid material 560 may be applied to the flexible eduction tube 524 by coextrusion, spraying or a dip coating process. The coextrusion process allows two or more thermoplastic materials to be extruded simultaneously into layers to fabricate the flexible eduction tube 524 and the layer of soluble rigid material 560. For example, a thermoplastic material for the flexible eduction tube 524 may be coextruded along with a water soluble rigid material 560 so that the water soluble rigid material 560 is on the inner diameter 524A or the outer diameter 524B of the flexible eduction tube 524.

The flexible eduction tube 524 may be spray or dip coated after the flexible eduction tube 524 been extruded and cooled. The flexible eduction tube 524 may be dipped into a bath containing the soluble rigid material 560 to coat the inner diameter 524A and/or the outer diameter 524B of the flexible eduction tube 524. A continuous spray may be used to evenly coat the outer diameter 524B of the flexible eduction tube 524.

An important aspect of the present invention is the relationship between the liquid product 532 and the flexibility and density of the flexible eduction tube 524. The density of the flexible eduction tube 524 simultaneously affects the resistance of the bending and the "sinking" of the eduction tube 524 in a liquid product 532. The eduction tube 524 must have a density greater than the liquid product 532 in order to sink in the liquid product 532. Most liquid products 532 that are sprayed will have water having a specific gravity of 1.0 grams/cc and/or isopropyl alcohol having a specific gravity of 0.89 grams/cc as a major ingredient. Although most liquid products 532 have a density close to 1.0 grams/cc, testing of flexible eduction tubes 524 appeared to work best at densities of 1.15 grams/cc and greater. For a density of 1.15 grams/cc, the flexible eduction tube 524 must be very flexible having a flexural modulus of approximately 2,800 psi for a 8 inch section. Although a very flexible eduction tube 524 performs well with a length of six inches, the very flexible eduction tube 524 is extremely difficult to handle during the assembly of the aerosol valve 522 and the insertion into the container 512. A stiffer and denser material improves the performance during the manufacture thereof.

The flexible eduction tube may be analyzed with respect to a liquid product having a specific gravity of 1.0 g/cc and a measured deflection 1.0 inch over the entire length of eduction tube. The specific gravity in (lbs/in$^3$) is given by:

$$Specific\ Gravity_{(lbs/in3)}=Specific\ Gravity_{g/cc)}x0.0361$$

$$VOLUME=[(PI*R2)-(PI*R2)]*LENGTH$$

$$I_m=[PI*(d_o^4-d_i^4)]/64$$

$$DEFLECTION=(WGT*LENGTH^3)/(8*I_m*E)$$

$$Specific\ Gravity_{(lbs/ft3)}=Specific\ Gravity_{(lbs/in3)}*1728$$

$$BUOYANCY\ FORCE=[Specific\ weight_{(fluid)}-Specific\ weight_{(tube)}]*Volume_{tube)}$$

TABLES I–XI set forth the modulus of elasticity and buoyancy force for the flexible eduction tubes 224 of various inner diameters 224A and outer diameters 224B, lengths, and densities when the distal end 228 of the flexible eduction tube 224 is deflected one inch by gravity within a liquid product having a density of 1.0 grams/cc. TABLES XII–XIII set forth a list of filler material and the properties thereof suitable for use with the present invention.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

TABLE I (0.03" ID × 0.100 OD × 5" LONG)

| SP GRAV. (g/cc) | SP. GRAV. (lb/in$^3$) | VOLUME OF TUBE (in$^3$) | WGT OF TUBE (lbs) | MOMENT OF INERTIA (in$^4$) | MODULUS OF ELAST. lbs/in$^2$) | SPEC GRAVITY (lbs/ft$^3$) | BUOYANCY FORCE |
|---|---|---|---|---|---|---|---|
| 0.90 | 0.03249 | 0.03574 | 0.00116 | 0.000004869 | 3725.92 | 56.1427 | 7.1772 |
| 0.95 | 0.03430 | 0.03574 | 0.00123 | 0.000004869 | 3932.91 | 59.2618 | 3.5881 |
| 0.98 | 0.03538 | 0.03574 | 0.00126 | 0.000004869 | 4057.11 | 61.1332 | 1.4347 |
| 0.99 | 0.03574 | 0.03574 | 0.00128 | 0.000004869 | 4098.51 | 61.7570 | 0.7169 |
| 1.00 | 0.03610 | 0.03574 | 0.00129 | 0.000004869 | 4139.91 | 62.3808 | 0.0009 |
| 1.10 | 0.03971 | 0.03574 | 0.00142 | 0.000004869 | 4553.90 | 68.6189 | −7.1790 |
| 1.20 | 0.04332 | 0.03574 | 0.00155 | 0.000004869 | 4967.89 | 74.8570 | −14.3571 |
| 1.30 | 0.04693 | 0.03574 | 0.00168 | 0.000004869 | 5381.88 | 81.0950 | −21.5352 |
| 1.40 | 0.05054 | 0.03574 | 0.00181 | 0.000004869 | 5795.87 | 87.3331 | −28.7133 |
| 1.50 | 0.05415 | 0.03574 | 0.00194 | 0.000004869 | 6209.86 | 93.5712 | −35.8914 |
| 1.60 | 0.05776 | 0.03574 | 0.00206 | 0.000004869 | 6623.85 | 99.8093 | −43.0695 |
| 1.70 | 0.06137 | 0.03574 | 0.00219 | 0.000004869 | 7037.84 | 106.0474 | −50.2476 |
| 1.80 | 0.06498 | 0.03574 | 0.00232 | 0.000004869 | 7451.83 | 112.2854 | −57.4257 |

TABLE II (0.04" ID x 0.100 OD x 5" LONG)

| SP GRAV. (g/cc) | SP. GRAV. (lb/in$^3$) | VOLUME OF TUBE (in$^3$) | WGT OF TUBE (lbs) | MOMENT OF INERTIA (in$^4$) | MODULUS OF ELAST. lbs/in$^2$) | SPEC GRAVITY (lbs/ft$^3$) | BUOYANCY FORCE |
|---|---|---|---|---|---|---|---|
| 0.90 | 0.03249 | 0.03299 | 0.00107 | 0.0000047831 | 3501.08 | 56.1427 | 6.6251 |
| 0.95 | 0.03430 | 0.03299 | 0.00113 | 0.0000047831 | 3695.58 | 59.2618 | 3.3121 |
| 0.98 | 0.03538 | 0.03299 | 0.00117 | 0.0000047831 | 3812.28 | 61.1332 | 1.3243 |
| 0.99 | 0.03574 | 0.03299 | 0.00118 | 0.0000047831 | 3851.19 | 61.7570 | 0.6617 |
| 1.00 | 0.03610 | 0.03299 | 0.00119 | 0.0000047831 | 3890.09 | 62.3808 | –0.0008 |
| 1.10 | 0.03971 | 0.03299 | 0.00131 | 0.0000047831 | 4279.09 | 68.6189 | –6.6268 |
| 1.20 | 0.04332 | 0.03299 | 0.00143 | 0.0000047831 | 4668.10 | 74.8570 | –13.2527 |
| 1.30 | 0.04693 | 0.03299 | 0.00155 | 0.0000047831 | 5057.11 | 81.0950 | –19.8786 |
| 1.40 | 0.05054 | 0.03299 | 0.00167 | 0.0000047831 | 5446.12 | 87.3331 | –26.5046 |
| 1.50 | 0.05415 | 0.03299 | 0.00179 | 0.0000047831 | 5835.13 | 93.5712 | –33.1305 |
| 1.60 | 0.05776 | 0.03299 | 0.00191 | 0.0000047831 | 6224.14 | 99.8093 | –39.7564 |
| 1.70 | 0.06137 | 0.03299 | 0.00202 | 0.0000047831 | 6613.16 | 106.0474 | –46.3824 |
| 1.80 | 0.06498 | 0.03299 | 0.00214 | 0.0000047831 | 7002.16 | 112.2854 | –53.0083 |

TABLE III (0.05" ID x 0.100 OD x 5" LONG)

| SP GRAV. (g/cc) | SP. GRAV. (lb/in$^3$) | VOLUME OF TUBE (in$^3$) | WGT OF TUBE (lbs) | MOMENT OF INERTIA (in$^4$) | MODULUS OF ELAST. lbs/in$^2$) | SPEC GRAVITY (lbs/ft$^3$) | BUOYANCY FORCE |
|---|---|---|---|---|---|---|---|
| 0.90 | 0.03249 | 0.02945 | 0.00096 | 0.000004602 | 3249.00 | 56.1427 | 5.9153 |
| 0.95 | 0.03430 | 0.02945 | 0.00101 | 0.000004602 | 3429.50 | 59.2618 | 2.9572 |
| 0.98 | 0.03538 | 0.02945 | 0.00104 | 0.000004602 | 3537.80 | 61.1332 | 1.1824 |
| 0.99 | 0.03574 | 0.02945 | 0.00105 | 0.000004602 | 3573.90 | 61.7570 | 0.5908 |
| 1.00 | 0.03610 | 0.02945 | 0.00106 | 0.000004602 | 3610.00 | 62.3808 | –0.0008 |
| 1.10 | 0.03971 | 0.02945 | 0.00117 | 0.000004602 | 3971.00 | 68.6189 | –5.9168 |
| 1.20 | 0.04332 | 0.02945 | 0.00128 | 0.000004602 | 4332.00 | 74.8570 | –11.8328 |
| 1.30 | 0.04693 | 0.02945 | 0.00138 | 0.000004602 | 4693.00 | 81.0950 | –17.7488 |
| 1.40 | 0.05054 | 0.02945 | 0.00149 | 0.000004602 | 5054.00 | 87.3331 | –23.6648 |
| 1.50 | 0.05415 | 0.02945 | 0.00159 | 0.000004602 | 5415.00 | 93.5712 | –29.5808 |
| 1.60 | 0.05776 | 0.02945 | 0.00170 | 0.000004602 | 5776.00 | 99.8093 | –35.4968 |
| 1.70 | 0.06137 | 0.02945 | 0.00181 | 0.000004602 | 6137.00 | 106.0474 | –41.4128 |
| 1.80 | 0.06498 | 0.02945 | 0.00191 | 0.000004602 | 6498.00 | 112.2854 | –47.3288 |

TABLE IV (0.03" ID x 0.100" OD x 6" LONG)

| SP GRAV. (g/cc) | SP. GRAV. (lb/in$^3$) | VOLUME OF TUBE (in$^3$) | WGT OF TUBE (lbs) | MOMENT OF INERTIA (in$^4$) | MODULUS OF ELAST. lbs/in$^2$) | SPEC GRAVITY (lbs/ft$^3$) | BUOYANCY FORCE |
|---|---|---|---|---|---|---|---|
| 0.90 | 0.03249 | 0.04288 | 0.00139 | 0.000004869 | 7726.06 | 56.1427 | 8.6126 |
| 0.95 | 0.03430 | 0.04288 | 0.00147 | 0.000004869 | 8155.29 | 59.2618 | 4.3058 |
| 0.98 | 0.03538 | 0.04288 | 0.00152 | 0.000004869 | 8412-82 | 61.1332 | 1.7216 |
| 0.99 | 0.03574 | 0.04288 | 0.00153 | 0.000004869 | 8498-67 | 61.7570 | 0.8603 |
| 1.00 | 0.03610 | 0.04288 | 0.00155 | 0.000004869 | 8584.51 | 62.3808 | –0.0011 |
| 1.10 | 0.03971 | 0.04288 | 0.00170 | 0.000004869 | 9442.97 | 68.6189 | –8.6148 |
| 1.20 | 0.04332 | 0.04288 | 0.00186 | 0.000004869 | 10301.42 | 74.8570 | –17.2285 |
| 1.30 | 0.04693 | 0.04288 | 0.00201 | 0.000004869 | 11159.87 | 81.0950 | –25.8422 |
| 1.40 | 0.05054 | 0.04288 | 0.00217 | 0.000004869 | 12018.32 | 87.3331 | –34.4560 |
| 1.50 | 0.05415 | 0.04288 | 0.00232 | 0.000004869 | 12876.77 | 93.5712 | –43.0697 |
| 1.60 | 0.05776 | 0.04288 | 0.00248 | 0.000004869 | 13735.22 | 99.8093 | –51.6834 |
| 1.70 | 0.06137 | 0.04288 | 0.00263 | 0.000004869 | 14593.67 | 106.0474 | –60.2971 |
| 1.80 | 0.06498 | 0.04288 | 0.00279 | 0.000004869 | 15452.12 | 112.2854 | –68.9108 |

TABLE V (0.04" ID × 0.100" OD × 6" LONG)

| SP GRAV. (g/cc) | SP. GRAV. (lb/in³) | VOLUME OF TUBE (in³) | WGT OF TUBE (lbs) | MOMENT OF INERTIA (in⁴) | MODULUS OF ELAST. lbs/in²) | SPEC GRAVITY (lbs/ft³) | BUOYANCY FORCE |
|---|---|---|---|---|---|---|---|
| 0.90 | 0.03249 | 0.03958 | 0.00129 | 0.0000047831 | 7259.83 | 56.1427 | 7.9501 |
| 0.95 | 0.03430 | 0.03958 | 0.00136 | 0.0000047831 | 7663.16 | 59.2618 | 3.9745 |
| 0.98 | 0.03538 | 0.03958 | 0.00140 | 0.0000047831 | 7905.15 | 61.1332 | 1.5892 |
| 0.99 | 0.03574 | 0.03958 | 0.00141 | 0.0000047831 | 7985.82 | 61.7570 | 0.7941 |
| 1.00 | 0.03610 | 0.03958 | 0.00143 | 0.0000047831 | 8066.48 | 62.3808 | −0.0010 |
| 1.10 | 0.03971 | 0.03958 | 0.00157 | 0.0000047831 | 8873.13 | 68.6189 | −7.9521 |
| 1.20 | 0.04332 | 0.03958 | 0.00171 | 0.0000047831 | 9679.78 | 74.8570 | −15.9033 |
| 1.30 | 0.04693 | 0.03958 | 0.00186 | 0.0000047831 | 10486.43 | 81.0950 | −23.8544 |
| 1.40 | 0.05054 | 0.03958 | 0.00200 | 0.0000047831 | 11293.08 | 87.3331 | −31.8055 |
| 1.50 | 0.05415 | 0.03958 | 0.00214 | 0.0000047831 | 12099.72 | 93.5712 | −39.7566 |
| 1.60 | 0.05776 | 0.03958 | 0.00229 | 0.0000047831 | 12906.37 | 99.8093 | −47.7077 |
| 1.70 | 0.06137 | 0.03958 | 0.00243 | 0.0000047831 | 13713.02 | 106.0474 | −55.6589 |
| 1.80 | 0.06498 | 0.03958 | 0.00257 | 0.0000047831 | 14519.67 | 112.2854 | −63.6100 |

TABLE VI (0.05" ID × 0.100" OD × 6" LONG)

| SP GRAV. (g/cc) | SP. GRAV. (lb/in³) | VOLUME OF TUBE (in³) | WGT OF TUBE (lbs) | MOMENT OF INERTIA (in⁴) | MODULUS OF ELAST. lbs/in²) | SPEC GRAVITY (lbs/ft³) | BUOYANCY FORCE |
|---|---|---|---|---|---|---|---|
| 0.90 | 0.03249 | 0.03534 | 0.00115 | 0.0000004602 | 6737.13 | 56.1427 | 7.9501 |
| 0.95 | 0.03430 | 0.03534 | 0.00121 | 0.0000004602 | 7111.41 | 59.2618 | 3.9745 |
| 0.98 | 0.03538 | 0.03534 | 0.00125 | 0.0000004602 | 7335.98 | 61.1332 | 1.5892 |
| 0.99 | 0.03574 | 0.03S34 | 0.00126 | 0.0000004602 | 7410.84 | 61.7570 | 0.7941 |
| 1.00 | 0.03610 | 0.03534 | 0.00128 | 0.0000004602 | 7485.70 | 62.3808 | −0.0010 |
| 1.10 | 0.03971 | 0.03534 | 0.00140 | 0.0000004602 | 8234.27 | 68.6189 | −7.9521 |
| 1.20 | 0.04332 | 0.03534 | 0.00153 | 0.0000004602 | 8982.84 | 74.8570 | −15.9033 |
| 1.30 | 0.04693 | 0.03534 | 0.00156 | 0.0000004602 | 9731.40 | 81.0950 | −23.8544 |
| 1.40 | 0.05054 | 0.03534 | 0.00179 | 0.0000004602 | 10479.97 | 87.3331 | −31.8055 |
| 1.50 | 0.05415 | 0.03534 | 0.00191 | 0.0000004602 | 11228.54 | 93.5712 | −39.7566 |
| 1.60 | 0.05776 | 0.03534 | 0.00204 | 0.0000004602 | 11977.11 | 99.8093 | −47.7077 |
| 1.70 | 0.06137 | 0.03534 | 0.00217 | 0.0000004602 | 12725.68 | 106.0474 | −55.6589 |
| 1.80 | 0.06498 | 0.03534 | 0.00230 | 0.0000004602 | 13474.25 | 112.2854 | −63.6100 |

TABLE VII (0.03" ID × 0.100" OD × 8" LONG)

| SP GRAV. (g/cc) | SP. GRAV. (lb/in³) | VOLUME OF TUBE (in³) | WGT OF TUBE (lbs) | MOMENT OF INERTIA (in⁴) | MODULUS OF ELAST. lbs/in²) | SPEC GRAVITY (lbs/ft³) | BUOYANCY FORCE |
|---|---|---|---|---|---|---|---|
| 0.90 | 0.03249 | 0.05718 | 0.00186 | 0.0000004869 | 24418.17 | 56.1427 | 11.4835 |
| 0.95 | 0.03430 | 0.05718 | 0.00196 | 0.0000004869 | 25774.74 | 59.2618 | 5.7410 |
| 0.98 | 0.03538 | 0.05718 | 0.00202 | 0.0000004869 | 26588.68 | 61.1332 | 2.2955 |
| 0.99 | 0.03574 | 0.05718 | 0.00204 | 0.0000004869 | 26859.99 | 61.7570 | 1.1470 |
| 1.00 | 0.03610 | 0.05718 | 0.00206 | 0.0000004869 | 27131.30 | 62.3808 | −0.0015 |
| 1.10 | 0.03971 | 0.05718 | 0.00227 | 0.0000004869 | 29844.43 | 68.6189 | −11.4864 |
| 1.20 | 0.04332 | 0.05718 | 0.00248 | 0.0000004869 | 32557.56 | 74.8570 | −22.9714 |
| 1.30 | 0.04693 | 0.05718 | 0.00268 | 0.0000004869 | 35270.69 | 81.0950 | −34.4563 |
| 1.40 | 0.05054 | 0.05718 | 0.00289 | 0.0000004869 | 37983.82 | 87.3331 | −45.9413 |
| 1.50 | 0.05415 | 0.05718 | 0.00310 | 0.0000004869 | 40696.95 | 93.5712 | −57.4262 |
| 1.60 | 0.05776 | 0.05718 | 0.00330 | 0.0000004869 | 43410.08 | 99.8093 | −68.9112 |
| 1.70 | 0.06137 | 0.05718 | 0.00351 | 0.0000004869 | 46123.21 | 106.0474 | −80.3961 |
| 1.80 | 0.06498 | 0.05718 | 0.00372 | 0.0000004869 | 48836.34 | 112.2854 | −91.8811 |

TABLE VIII (0.04" ID x 0.100" OD x 8" LONG)

| SP GRAV. (g/cc) | SP. GRAV. (lb/in$^3$) | VOLUME OF TUBE (in$^3$) | WGT OF TUBE (lbs) | MOMENT OF INERTIA (in$^4$) | MODULUS OF ELAST. lbs/in$^2$) | SPEC GRAVITY (lbs/ft$^3$) | BUOYANCY FORCE |
|---|---|---|---|---|---|---|---|
| 0.90 | 0.03249 | 0.05278 | 0.00171 | 0.0000047831 | 22944.66 | 56.1427 | 10.6001 |
| 0.95 | 0.03430 | 0.05278 | 0.00181 | 0.0000047831 | 24219.37 | 59.2618 | 5.2994 |
| 0.98 | 0.03538 | 0.05278 | 0.00187 | 0.0000047831 | 24984.19 | 61.1332 | 2.1189 |
| 0.99 | 0.03574 | 0.05278 | 0.00189 | 0.0000047831 | 25239.13 | 61.7570 | 1.0588 |
| 1.00 | 0.03610 | 0.05278 | 0.00191 | 0.0000047831 | 25494.07 | 62.3808 | –0.0014 |
| 1.10 | 0.03971 | 0.05278 | 0.00210 | 0.0000047831 | 28043.48 | 68.6189 | –10.6029 |
| 1.20 | 0.04332 | 0.05278 | 0.00229 | 0.0000047831 | 30592.88 | 74.8570 | –21.2043 |
| 1.30 | 0.04693 | 0.05278 | 0.00248 | 0.0000047831 | 33142.29 | 81.0950 | –31.8058 |
| 1.40 | 0.05054 | 0.05278 | 0.00267 | 0.0000047831 | 35691.70 | 87.3331 | –42.4073 |
| 1.50 | 0.05415 | 0.05278 | 0.00286 | 0.0000047831 | 38241.10 | 93.5712 | –53.0088 |
| 1.60 | 0.05776 | 0.05278 | 0.00305 | 0.0000047831 | 40790.51 | 99.8093 | –63.6103 |
| 1.70 | 0.06137 | 0.05278 | 0.00324 | 0.0000047831 | 43339.92 | 106.0474 | –74.2118 |
| 1.80 | 0.06498 | 0.05278 | 0.00343 | 0.0000047831 | 45889.32 | 112.2854 | –84.8133 |

TABLE IX (0.04" ID x 0.100" OD x 8" LONG)

| SP GRAV. (g/cc) | SP. GRAV. (lb/in$^3$) | VOLUME OF TUBE (in$^3$) | WGT OF TUBE (lbs) | MOMENT OF INERTIA (in$^4$) | MODULUS OF ELAST. lbs/in$^2$) | SPEC GRAVITY (lbs/ft$^3$) | BUOYANCY FORCE |
|---|---|---|---|---|---|---|---|
| 0.90 | 0.03249 | 0.04712 | 0.00153 | 0.000004602 | 21292.65 | 56.1427 | 9.4644 |
| 0.95 | 0.03430 | 0.04712 | 0.00162 | 0.000004602 | 22475.57 | 59.2618 | 4.7316 |
| 0.98 | 0.03538 | 0.04712 | 0.00167 | 0.000004602 | 23185.33 | 61.1332 | 0.8919 |
| 0.99 | 0.03574 | 0.04712 | 0.00168 | 0.000004602 | 23421.91 | 61.7570 | 0.9453 |
| 1.00 | 0.03610 | 0.04712 | 0.00170 | 0.000004602 | 23658.50 | 62.3808 | –0.0012 |
| 1.10 | 0.03971 | 0.04712 | 0.00187 | 0.000004602 | 26024.35 | 68.6189 | –9.4668 |
| 1.20 | 0.04332 | 0.04712 | 0.00204 | 0.000004602 | 28390.20 | 74.8570 | –18.9324 |
| 1.30 | 0.04693 | 0.04712 | 0.00221 | 0.000004602 | 30756.04 | 81.0950 | –28.3981 |
| 1.40 | 0.05054 | 0.04712 | 0 00238 | 0.000004602 | 33121.89 | 87.3331 | –37.8637 |
| 1.50 | 0.05415 | 0.04712 | 0.00255 | 0.000004602 | 35487.74 | 93.5712 | –47.3293 |
| 1.60 | 0.05776 | 0.04712 | 0.00272 | 0.000004602 | 37853.59 | 99.8093 | –56.7949 |
| 1.70 | 0.06137 | 0.04712 | 0.00289 | 0.000004602 | 40219.44 | 106.0474 | –66.2605 |
| 1.80 | 0.06498 | 0.04712 | 0.00306 | 0.000004602 | 42585.29 | 112.2854 | –75.7262 |

TABLE X (0.04" ID x 0.100" OD x 8" LONG)

| SP GRAV. (g/cc) | SP. GRAV. (lb/in$^3$) | VOLUME OF TUBE (in$^3$) | WGT OF TUBE (lbs) | MOMENT OF INERTIA (in$^4$) | MODULUS OF ELAST. lbs/in$^2$) | SPEC GRAVITY (lbs/ft$^3$) | BUOYANCY FORCE |
|---|---|---|---|---|---|---|---|
| 0.90 | 0.03249 | 0.05278 | 0.00171 | 0.0000219912 | 2105.35 | 56.1427 | 10.6001 |
| 0.95 | 0.03430 | 0.05278 | 0.00181 | 0.0000219912 | 2222.32 | 59.2618 | 5.2994 |
| 0.98 | 0.03538 | 0.05278 | 0.00187 | 0.0000219912 | 2292.49 | 61.1332 | 2.1189 |
| 0.99 | 0.03574 | 0.05278 | 0.00189 | 0.0000219912 | 2315.89 | 61.7570 | 1.0588 |
| 1.00 | 0.03610 | 0.05278 | 0.00191 | 0.0000219912 | 2339.28 | 62.3808 | –0.0014 |
| 1.10 | 0.03971 | 0.05278 | 0.00210 | 0.0000219912 | 2573.21 | 68.6189 | –10.6029 |
| 1.20 | 0.04332 | 0.05278 | 0.00229 | 0.0000219912 | 2807.14 | 74.8570 | –21.2043 |
| 1.30 | 0.04693 | 0.05278 | 0.00248 | 0.0000219912 | 3041.06 | 81.0950 | –31.8058 |
| 1.40 | 0.05054 | 0.05278 | 0,00267 | 0.0000219912 | 3274.99 | 87.3331 | –42.4073 |
| 1.50 | 0.05415 | 0.05278 | 0.00286 | 0.0000219912 | 3508.92 | 93.5712 | –53.0088 |
| 1.60 | 0.05776 | 0.05278 | 0.00305 | 0.0000219912 | 3742.85 | 99.8093 | –63.6103 |
| 1.70 | 0.06137 | 0.05278 | 0.00324 | 0.0000219912 | 3976.78 | 106.0474 | –74.2118 |
| 1.80 | 0.06498 | 0.05278 | 0.00343 | 0.0000219912 | 4210.70 | 112.2854 | –84.8133 |

TABLE XI

| (0.04" ID × 0.100" OD × 8" LONG) | | | | | | | |
|---|---|---|---|---|---|---|---|
| SP GRAV. (g/cc) | SP. GRAV. (lb/in³) | VOLUME OF TUBE (in³) | WGT OF TUBE (lbs) | MOMENT OF INERTIA (in⁴) | MODULUS OF ELAST. lbs/in²) | SPEC GRAVITY (lbs/ft³) | BUOYANCY FORCE |
| 0.90 | 0.03249 | 0.09037 | 0.00229 | 0.0000219912 | 6653.95 | 56.1427 | 14.134 |
| 0.95 | 0.03430 | 0-07037 | 0.00241 | 0.0000219912 | 7023.62 | 59.2618 | 7.066 |
| 0.98 | 0.03538 | 0.07037 | 0.00249 | 0.0000219912 | 7245.41 | 61.1332 | 2.825 |
| 0.99 | 0.03574 | 0.07037 | 0.00252 | 0.0000219912 | 7319.35 | 61.7570 | 1.412 |
| 1.00 | 0.03610 | 0.07037 | 0.00254 | 0.0000219912 | 7393.28 | 62.3808 | −0.002 |
| 1.10 | 0.03971 | 0.07037 | 0.00279 | 0.0000219912 | 8132.61 | 68.6189 | −14.137 |
| 1.20 | 0.04332 | 0.07037 | 0.00305 | 0.0000219912 | 8871.94 | 74.8570 | −28.272 |
| 1.30 | 0.04693 | 0.07037 | 0.00330 | 0.0000219912 | 9611.26 | 81.0950 | −42.408 |
| 1.40 | 0.05054 | 0.07037 | 0.00356 | 0.0000219912 | 10350.59 | 87.3331 | −56.543 |
| 1.50 | 0.05415 | 0.07037 | 0.00381 | 0.0000219912 | 11089.92 | 93.5712 | −70.678 |
| 1.60 | 0.05776 | 0.07037 | 0.00406 | 0.0000219912 | 11829.25 | 99.8093 | −84.814 |
| 1.70 | 0.06137 | 0.07037 | 0.00432 | 0.0000219912 | 12568.58 | 106.0474 | −98.949 |
| 1.80 | 0.06498 | 0.07037 | 0.00457 | 0.0000219912 | 13307.90 | 112.2854 | −113.084 |

TABLE XII

| FILLER MATERIALS FOR FLEXIBLE EDUCTION TUBE | | | | |
|---|---|---|---|---|
| CHEMICAL CLASS | DESCRIPTION | SPECIFIC GRAVITY | PARTICLE SIZE(μ) | PARTICLE SHAPE |
| CARBIDE | SILICON CARBIDE | 3.2 | | |
| OXIDE | ALUMINUM OXIDE | 3.4–4.0 | | |
| | ALUMINUM TRIHYDRATE | 2.42 | <1–40 | |
| | MAGNESION OXIDE | 3.6 | | |
| | TITANIUM DIOXIDE | 3.8–4.3 | | |
| | ZINC OXIDE | 5.47 | | |
| | ZIRCONIUM DIOXIDE | 5.73 | | |
| SALT | CALCIUM CARBONATE | 2.6–3.1 | <40 | |
| SULFATE | BARIUM SULFATE | 4.25–4.5 | | |
| SULFIDE | MOLYBDENUM DISULFIDE | 4.8 | | |
| | ZINC SULFIDE | 3.98–4.1 | | |
| SILICATE | ALUMINUM SILICATE (KAOLINITE) | 2.5–2.63 | 0.3–9 | PLATELETS |
| | ZIRCONIUM SILICATE | 4.5–4.68 | | (ZIRCON) |
| | CALCIUM SILICATE (WOLLASTONITE) | 2.9 | | ACICULAR |
| | POTASSIUM ALUMINO SILICATE (MICA) | 2.7–3.2 | | PLATELETS |
| | Magnesium SILICATE (TALC) | 2.7–2.8 | | PLATELETS |
| | SILICA | 2.65 | 2.9 | |
| | SODIUM ALUMLNO SILICATE | 2.7–3.2 | | PLATELETS |
| | GLASS MLCROBEADS | 2.48 | 5–700 | SPHERES |
| TITANATE | BARIUM TITANATE | 5.9–5.95 | | |
| ORGANIC | CARBON BLACK | | 10–300 | |

TABLE XIII

| FLEXIBLE MATERIALS | | | | |
|---|---|---|---|---|
| MATERIAL DESCRIPTION DESCRIPTION | SHORE HARDNESS | FLEXURAL MODULUS | TENSILE 100% MODULUS | TENSILE 300% MODULUS |
| ETHYLENE VINYL ACETATE (EVA) | 7OA–98A | 2000–22,000 | | |
| ETHYLENE ETHYL ACRYLATE (EEA) | 88A | 9500 | | |
| ETHYLENE METHYL ACRYLATE (EMA) | 4CD–53D | 5800–13,000 | | |
| POLYVINYL CHLORIDE (PVC) | 3OA–50D | | | |
| POLYPROPYLENE/EPDM ELASTOMER | 45A–50D | | 230–1450 | |
| POLYPROPYLFNE/BUTYL ELASTOMER | 4OA–30A | | 130–840 | |
| POLYPROPYLENE/NATURAL RUBBER ELASTOMER | 6OA–50D | | 310–1520 | |
| VERY-LOW DENSITY POLYETHYLENE | 70A | | 420 | |
| RUBBER - NEOPRENE | 35A–50D | | | |
| RUBBER - ETHYLENE PROPYLENE | | | | |

TABLE XIII-continued

| FLEXIBLE MATERIALS | | | | |
|---|---|---|---|---|
| MATERIAL DESCRIPTION DESCRIPTION | SHORE HARDNESS | FLEXURAL MODULUS | TENSILE 100% MODULUS | TENSILE 300% MODULUS |
| RUBBER - ACRYLONITRILE BUTADIENE | | | | |
| RUBBER - ISOPRENE | | | | |
| CROSS-LINKED HALOGENATED POLYOLEFIN ALLOY (ALCRYN FROM DUPONT) | 57A–77A | | 410–1100 | |
| FLUOROELASTOMERS | 72A–80A | | 540–1050 | |
| STYRENE-ISOPRENE–STYRENE | 4OA–50D | | | 220–1150 |
| STYRENE-BUTADIENE–STYRENE | 401–50D | | | 220–1150 |
| STYRENE-ETHYLENE BUTADIENE–STYRENE | 3OA–50D | | | 150–2000 |
| POLYVINYL CHLORIDE/NITRILE | 4OA–80A | 260–660 | | |

What is claimed is:

1. In a container having a dispensing device for discharging a liquid product from the container with a dispensing mechanism, the dispensing mechanism being secured to the container and having an eduction tube extending into the container and into the liquid product within the container for enabling the liquid product to enter the eduction tube and to be discharged from a terminal orifice upon actuation of the dispensing mechanism, the improvement comprising:

said eduction tube polymeric material; and a rigid means cooperating with said eduction tube for providing a non-flexible eduction tube prior to insertion of the flexible polymeric material within the container and for providing a flexible eduction tube upon insertion of the eduction tube within the container interaction of said rigid means with the liquid product within the container.

2. In a container having a dispensing device for discharging a liquid product from the container with a dispensing mechanism, the dispensing mechanism being secured to the container and having an eduction tube extending into the container and into the liquid product within the container for enabling the liquid product to enter the eduction tube and to be discharged from a terminal orifice upon actuation of the dispensing mechanism, the improvement comprising:

said eduction tube comprising a mixture of a flexible polymeric material with a dense filler material distributed throughout and within said flexible material to provide said eduction tube with a specific gravity greater than the liquid product within the container for enabling an input aperture of said eduction tube to remain below the level of the liquid product within the container when the container is tipped from a vertical orientation.

3. An improved flexible eduction tube for use in a dispensing mechanism as set forth in claim 2, wherein said dense filler material is uniformly dispersed within said eduction tube to produce a flexible eduction tube with a uniform density greater than the liquid product within the container.

4. An improved flexible eduction tube for use in a dispensing mechanism as set forth in claim 2, wherein said eduction tube comprises a flexible polymer; and said dense filler material comprises a dense organic powder to produce a flexible eduction tube with a density greater than 1.15.

5. An improved flexible eduction tube for use in a dispensing mechanism as set forth in claim 2, wherein said eduction tube comprises an olefin-based thermoplastic elastomer; and said dense filler material comprises barium sulfate in an amount sufficient to produce a flexible eduction tube with a density greater than 1.15.

6. In a container having a dispensing device for discharging a liquid product from the container with a dispensing mechanism, the dispensing mechanism being secured to the container and having an eduction tube extending into the container and into the liquid product within the container for enabling the liquid product to enter the eduction tube and to be discharged from a terminal orifice upon actuation of the dispensing mechanism, the improvement comprising:

said eduction polymeric material comprising a flexible tube and an absorbent material;

said absorbent material of said eduction tube having a generally non-flexible physical characteristic when said absorbent material is void of an absorbed liquid product;

said absorbent material of said eduction tube having a flexible physical characteristic when said absorbent material has absorbed the liquid product;

said absorbent material providing said eduction tube with a non-flexible physical characteristic when said absorbent material is void of an absorbed liquid product for facilitating insertion of said eduction tube within the container; and said absorbent material providing said eduction tube with a flexible physical characteristic when said absorbent material has absorbed liquid product from the container for enabling an input aperture of said eduction tube to remain below the level of the liquid product within the container when the container is tipped from a vertical orientation.

7. An improved flexible eduction tube for use in a dispensing mechanism as set forth in claim 6, wherein said absorbent material is uniformly dispersed within said eduction tube to produce a flexible eduction tube with a uniform absorption of the liquid product within the container.

* * * * *

UNITED STATES PATENT AND TRADEMARK OFFICE

CERTIFICATE OF CORRECTION

PATENT NO. : 5,527,577

DATED : June 18, 1996

INVENTOR(S) : Peter J. Walters et al.

It is certified that error appears in the above-indentified patent and that said Letters Patent is hereby corrected as shown below:

Column 9, line 67, delete "24" and insert therefor --224--.

Col. 17, Table VI, Volume of Tube, line 4, delete "0.03S34" and insert therefor --0.03534--.

Col. 19, Table IX, delete "0.04" ID" and insert therefor --0.05" ID--.

Col.19&20,Table X, delete "(0.04" ID x 0.100" OD x 8" LONG) and insert therefore --(0.120" ID x 0.160" OD x 6" LONG)--.

Col.21&22,Table XI, delete "(0.04" ID x 0.100" OD x 8" LONG)" and insert therefore --(0.120" ID x 0.160" OD x 8" LONG)--.

Col. 21, Table XI, Volume of Tube, line 1, delete "0.09037" and insert therefore --0.07037--.

Col.21&22,Table XIII, Shore Hardness, line 3, delete "4CD" and insert therefore --40D--.

UNITED STATES PATENT AND TRADEMARK OFFICE

CERTIFICATE OF CORRECTION

PATENT NO. : 5,527,577

DATED : June 18, 1996

INVENTOR(S) : Peter J. Walters et al.

It is certified that error appears in the above-indentified patent and that said Letters Patent is hereby corrected as shown below:

Col. 23, line 27
Claim 1, line 10, delete "eduction tube" and insert therefore --flexible polymeric material--.

Col. 23, line 29
Claim 1, line 12, delete "flexible polymeric material" and insert therefore --eduction tube--.

Col. 23, line 31
Claim 1, line 14, after "container" insert --upon--.

Col. 24, lines 34 & 35
Claim 6, lines 9 and 10, delete in their entirety and insert therefore --said eduction tube comprising a flexible polymeric material and an absorbent material blended with or coated on a surface of said flexible polymeric material;--

Signed and Sealed this

First Day of October, 1996

Attest:

BRUCE LEHMAN

Attesting Officer

Commissioner of Patents and Trademarks